2,772,068

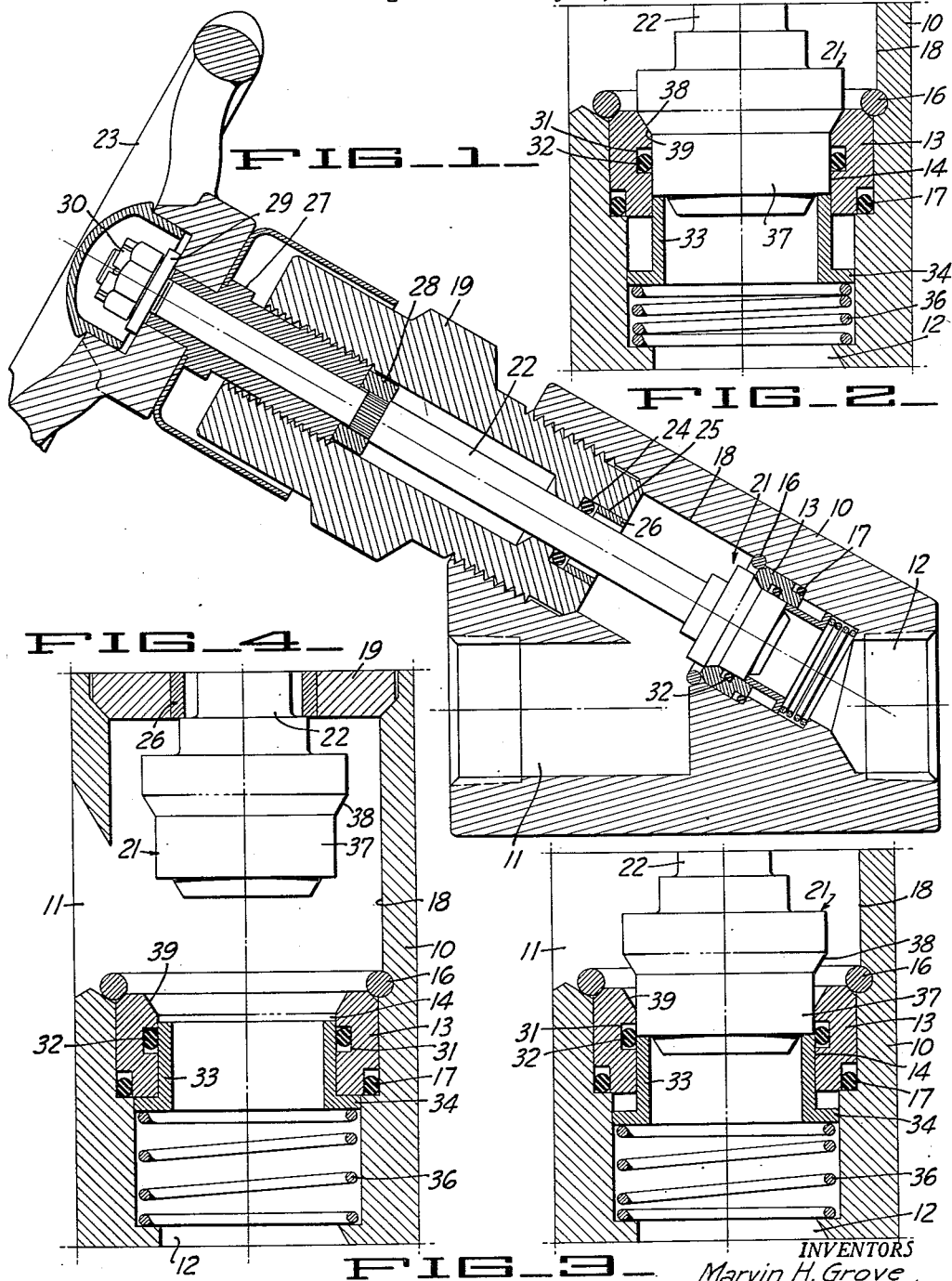

SEAL GUARD

Marvin H. Grove, Piedmont, and Austin U. Bryant, Berkeley, Calif., assignors, by mesne assignments, to Grove Valve and Regulator Company, Oakland, Calif., a corporation of California Original application May 15, 1948, Serial No. 27,308. Divided and this application October 9, 1951, Serial No. 250,418

1 Claim. (Cl. 251—332)

This invention relates generally to valves of the type utilizing a valve member movable between open and closed positions for controlling flow of fluid.

Conventional flow control valves of the globe or like type are characterized by the use of a valve member which is moved between open and closed positions with respect to a stationary valve seat. It is customary to use conical shaped seating surfaces on the seat and valve members, and for closed position these surfaces are urged together with considerable force. Both of the valve surfaces may be of metal, or one may be of or faced with resilient material such as synthetic rubber. In any event, the force required to maintain reasonably good fluid-tight seal tends to cause deterioration of either one or both of the valve working surfaces. When an operator experiences difficulty in obtaining a tight shut-off, there is a natural tendency to increase the closing force, with the result that deterioration is increased and the surfaces may be damaged to such an extent as to require replacement or repair.

As disclosed in our copending application Serial No. 27,308, filed May 15, 1948, now Patent No. 2,666,614, of which this application is a division, it is possible to construct a valve having sealing means of the O-ring type which makes possible a bubble-tight seal without applying undue force between valve working surfaces. The valve constituting the present invention makes use of such sealing means, and it is an object of the present invention to provide a novel and improved valve of this type.

A further object of the invention is to provide a valve utilizing a resilient seal ring between the valve seat and the movable valve member, in conjunction with the novel form of guard means cooperating with the seat and serving to protect and prevent dislodgment of the seal ring.

Another object of the invention is to provide a valve of the above character having both bubble-tight sealing means of the O-ring type and a seal between metal surfaces.

Additional objects of the invention will appear from the following description in which the preferred embodiment of the invention has been set forth in detail in conjunction with the accompanying drawing.

Referring to the drawing:

Figure 1 is a side elevational view in section illustrating a valve incorporating the present invention.

Figure 2 is an enlarged cross-sectional detail showing the working parts of the valve, and with the valve member in closed position.

Figures 3 and 4 are cross-sectional details like Figure 2, but showing the valve member in partially retracted and full open positions.

The valve illustrated in Figure 1 is of the manually operated type, and consists of a body 10 having inflow and outflow passages 11 and 12, which are adapted to be connected to associated piping. An annular seat member or ring 13, made of suitable metal, is disposed within the body and forms an annular throat orifice 14, which connects the passages 11 and 12 when the valve member is in open position. In order to seal the ring 13 with respect to the body, it may be held in position by soldering, brazing or welding, or, as illustrated, it may be retained in place by the snap ring 16, and sealed with respect to the body by the resilient O-ring 17. In place of a separately formed ring an annular seat member can be formed integral with and as a portion of the valve body.

The body has a bore 18 which is in alignment with the seat ring 13, and which is fitted with the bonnet 19. A movable valve member 21 is attached to one end of the operating stem 22, and this stem extends through the bonnet 19 for operative engagement to the hand wheel 23. Suitable means is provided for forming a seal between the stem 22 and the bonnet 19, such as the resilient O-ring 24, which is disposed in the annular recess 25, and held in place by the retainer ring 26.

As a part of the valve operating means, a bushing 27 is journaled upon the stem 22 and is threaded in the bonnet 19. The outer end of this bushing has a driving connection with the hand wheel 23. The inner end of bushing 27 engages a collar 28 which is fixed to stem 22, and the outer end of the bushing may abut a thrust washer 29, which is retained upon rod 22 by the nut 30. Thus upon turning the hand wheel 23 the valve stem 22 is moved in opposite directions to move the valve member 21 between open and closed positions. It will be evident that other types of operating means can be employed, such as pneumatic or hydraulic pressure operated diaphragms or pistons.

The construction of the valve member 21 and its associated parts can best be understood by reference to Figures 2 to 4 inclusive. The seat ring 13 is provided with an annular groove 31 which interrupts its inner periphery, and which serves to loosely accommodate the resilient seal ring 32. This seal ring is preferably of the O-ring type. Thus it is circular in cross-sectional contour, and is formed of suitable material such as resilient synthetic rubber, or a like elastomer. A guard member or ring 33 is slidably fitted within the seat ring 13, and its movement in an upward direction (i. e., toward that side of the seat exposed to passage 11) is limited by the flange 34. The outer cylindrical periphery of the guard ring 33 is only slightly less than the inner cylindrical periphery of the seat ring, to thereby provide a relatively snug sliding fit.

A compression spring 36 is seated within the body and normally urges the guard 33 toward the seal ring guarding position illustrated in Figures 3 and 4.

The valve member 21 is provided with a cylindrical portion 37 dimensioned to fit snugly within the inner periphery of the seat ring 13. Also it is provided with a conical metal valve surface 38, which is adapted to engage and form an approximate or secondary seal with respect to the conical surface 39 formed on the seal ring 13.

The valve described above operates as follows: Figure 4 shows the valve member in full open position. Note that the guard extends completely over the groove 31 to afford complete protection for the seal ring 32. When the valve member is moved toward closed position, it initially is brought into engagement with the upper end of the guard 33, as illustrated in Figure 2. At that time flow of fluid through the valve is greatly restricted, and is confined to the clearance between the seat ring and the cylindrical valve portion 37. Movement of the valve member beyond the position illustrated in Figure 3 serves to depress the guard 33 against the urge of the compression spring 36, whereby when the valve member is moved to full closed position as shown in Figure 2, its cylindrical periphery is in sealing engagement with the ring 32. Normally (i. e., for full open position) the resilient O-ring is compressed a slight amount in a radial direction, between the bottom surface of the groove 31 and the periphery of the guard 33. However as the valve member is moved to closed position, the seal ring is caused to transfer its contact from the protecting guard to the peripheral surface of the valve member, and this transfer occurs without opportunity for the O-ring to be dislodged from its groove by fluid flow.

In the foregoing description reference has been made to the passages 11 and 12 as providing inflow and outflow passages. Note however that when pressure is applied above the valve member, such pressure for open and partially open positions of the valve tends to urge the guard ring downwardly, and therefore under such conditions the spring 36 should be sufficiently strong to resist fluid pressure. When passage 12 is made the inlet, fluid pressure is applied to the underside of the valve member and therefore fluid pressure tends to act upon the guard to urge the same toward the O-ring protecting position illustrated in Figure 4.

It will be evident that the valve described above is capable of maintaining a bubble-tight seal between the seat and the valve member, without requiring application of a substantial amount of closing force. If the resilient O-ring should be mutilated, or excessively worn, then one can rely upon the conical metal surfaces for an approximate seal, the same as an ordinary globe valve.

A valve of the type described above is capable of use with relatively high fluid pressures, as for example pressures of the order of 2000 p. s. i. or more. Because of the manner in which the resilient O-ring is protected, it is not dislodged by the flow which occurs when the valve is being moved between closed and open positions.

We claim:

In a fluid flow control valve, a valve body having flow passages, means forming a valve seat assembly disposed within the body and providing a throat orifice serving to connect said passages, a rigid valve member associated with the seat assembly and movable between open and closed positions with respect to the same, said seat assembly including a seat ring formed to provide an inner cylindrical bore interposed between said valve passages, said ring being removably seated within the body, said valve member having a cylindrical portion slightly smaller than the cylindrical bore of the seat ring and adapted to interfit with the seat ring bore for closed position of the valve and to be withdrawn from one side of the seat ring for open position of the valve, a groove formed in the ring and interrupting the inner periphery of the same, a resilient seal ring of the O-ring type loosely disposed within said groove, a guard ring carried by the body and having one end thereof slidably fitted within said seat, said guard ring forming a part of the seat assembly and being movable between limiting positions in a direction axially of the seat, in one of said limiting positions the guard ring serving to close said groove and retain the seal ring, and in the other position the guard ring being retracted from the O-ring to expose the same for contact with the valve member, one end of said guard ring being adapted to abut the valve member for causing movement of the guard between said two limiting positions as the valve member is moved toward closed position within the seat ring, an outwardly extending flange on the other end of the guard adapted to abut the adjacent end of the seat ring to thereby limit movement of the guard in a direction toward the valve member, and a helicoidal spring aligned with said cylindrical bore and acting between the flange and the body for yieldably urging the guard ring toward said one limiting position of the same, said spring means embracing a substantially unobstructed body space which forms a fluid passage that directly connects the bore with the adjacent fluid passage of the body, whereby the convolutions of the spring are in the outer peripheral portion of said connecting passage, said guard ring being removable together with the seat ring.

References Cited in the file of this patent

UNITED STATES PATENTS

| 969,803 | Pollock | Sept. 13, 1910 |
| 1,385,019 | Mathieu | July 19, 1921 |
| 1,954,018 | Miller | Apr. 10, 1934 |
| 2,163,472 | Shimer | June 20, 1939 |
| 2,409,220 | Melichar | Oct. 15, 1946 |
| 2,414,451 | Christensen | Jan. 21, 1947 |
| 2,469,921 | Hoge | May 10, 1949 |
| 2,515,029 | Almond | July 11, 1950 |
| 2,583,539 | Bashark | Jan. 29, 1952 |
| 2,659,568 | Grove | Nov. 17, 1953 |
| 2,666,614 | Grove | Jan. 19, 1954 |

FOREIGN PATENTS

| 40,549 | Germany | of 1887 |